United States Patent [19]

Megiddo

[11] Patent Number: 5,481,658
[45] Date of Patent: Jan. 2, 1996

[54] METHOD AND APPARATUS FOR DISPLAYING A LINE PASSING THROUGH A PLURALITY OF BOXES

[75] Inventor: Nimrod Megiddo, Palo Alto, Calif.

[73] Assignee: International Business Machines Corporation, Armonk, N.Y.

[21] Appl. No.: 124,156

[22] Filed: Sep. 20, 1993

[51] Int. Cl.$^6$ .................................................. G06T 15/00
[52] U.S. Cl. ............................ 395/119; 395/118; 395/121
[58] Field of Search ........................... 395/118–121, 122, 395/123, 125, 119; 358/183

[56] References Cited

U.S. PATENT DOCUMENTS

| | | | |
|---|---|---|---|
| 4,479,192 | 10/1984 | Yamagami | 364/719 |
| 4,593,372 | 6/1986 | Bandai et al. | 364/719 |
| 4,593,377 | 6/1986 | Mitsuka | 364/900 |
| 4,710,876 | 12/1987 | Cline et al. | 364/414 |
| 4,719,535 | 1/1988 | Zhenjun et al. | 361/232 |
| 4,752,828 | 6/1988 | Chapuis et al. | 358/580 |
| 4,821,210 | 4/1989 | Rumbaugh | 364/518 |
| 5,038,285 | 8/1991 | Jouandet | 364/413.16 |
| 5,125,074 | 6/1992 | Lebeaute et al. | 395/125 |
| 5,293,467 | 3/1994 | Buchner et al. | 395/122 |

OTHER PUBLICATIONS

Nina Amenta, "Finding a Line Transversal of Axial Objects in Three Dimensions," Proceedings of the Third Annual ACM–SIAM Symposium on Discrete Algorithms, 1992, pp. 66–71.

Nimrod Megiddo, "Linear Programming in Linear Time When the Dimension is Fixed," Journal of the ACM, vol. 31, No. 1, Jan. 1984, pp. 114–127.

Primary Examiner—Mark K. Zimmerman
Assistant Examiner—Rudolph Buchel
Attorney, Agent, or Firm—Baker, Maxham, Jester & Meador

[57] ABSTRACT

A method and apparatus determine a line that passes through a set of rectangular, axial boxes defined by vertices in n-dimensional space in O(n) time using linear programming methods to obtain solutions, if they exist. The line is easily converted to a parametric representation by a suitable change of variables and is displayed in a two-dimensional representation. The method and apparatus are especially suited to the digital computer representation of objects as boxes and the problem of finding a line-of-sight through the boxes.

11 Claims, 5 Drawing Sheets

METHOD AND APPARATUS FOR DISPLAYING A LINE PASSING THROUGH A PLURALITY OF BOXES

BACKGROUND OF THE INVENTION

1. Field of the Invention

This invention relates to finding lines through axial objects and, more particularly, to finding a line that passes through a set of axial boxes in three-space and higher dimensions.

2. Description of the Related Art

Determining a line passing through a set of axial objects is a problem that has wide application. In the three-dimensional case, for example, the problem is especially important in computer graphics, when it is desirable to find a line-of-sight through a set of rectangular boxes or windows in the course of creating video displays. It is quite common to use sets of boxes in the digital computer representation of objects, such as computer axial tomographic (CAT) x-ray systems and nuclear magnetic resonance imaging (MRI) systems. See, for example, U.S. Pat. No. 4,710,876 to Cline et al. The general, n-dimensional case of the problem is encountered in statistics, when it is desirable to find a linear approximation for an n-dimensional data set specified by a set of ranges along each dimension. A line passing through all axial objects in a set is said to be a transversal line.

An example of a three-dimensional axial box is illustrated in FIG. 1, in which a box 10 is shown in three-space relative to three coordinate axes $D_1$, $D_2$, and $D_3$. The six sides of the box are defined by eight vertices. The box is axial because each pair of adjacent vertices defines a line segment that is parallel to one of the axes. Each vertex can be defined by a three-tuple $(n_1, n_2, n_3)$ in which the first position of the three-tuple is represented by either $a_i$ or $b_i$ where $i=1, 2, 3$. The value $a_1$ corresponds to the minimum value of the box side along the $D_1$ axis and the value $b_1$ corresponds to the maximum value of the box side along the $D_1$ axis. Similarly, the value $a_2$ corresponds to the minimum value of the box side along the $D_2$ axis and the value $b_2$ corresponds to the maximum value of the box side along the $D_2$ axis and, finally, $a_3$ corresponds to the minimum value along $D_3$ and $b_3$ corresponds to the maximum value along $D_3$. The projection of the box 10 onto the $D_1$–$D_3$ axial plane is shown in FIG. 1 to better illustrate the values of $a_1$, $a_3$, $b_1$, and $b_3$ along the respective $D_1$ and $D_3$ axes. The projection of the box onto the other axial planes should be apparent.

An example of the problem of finding a line passing through a plurality of three-dimensional axial boxes is shown in FIG. 2, in which three boxes 20, 22, and 24 are shown relative to three coordinate axes $D_1$, $D_2$, and $D_3$ with a line 26 passing through all three boxes. The transversal line 26 is defined by two points X and Y. The point X is specified by the three-tuple $(x_1, x_2, x_3)$, where the coordinates refer to the axes $D_1$, $D_2$, and $D_3$, respectively. The point Y is specified by the three-tuple $(y_1, Y_2, Y_3)$. The line 26 happens to be parallel to the $D_1$ axis but it should be clear that other lines not parallel to any of the coordinate axes also could pass through all three boxes 20, 22, and 24.

Those skilled in the an will recognize that the transversal line 26 extends through the three-dimensional space and that the line can be represented parametrically by u+tv, where u is a point on the line 26, v is a direction vector, and t is a scalar parameter. The scalar parameter t can be thought of as representing time and the point $u=(u_1, u_2, u_3)$ can be thought of as a point in the three-space defined by coordinate axes $R_1$, $R_2$, and $R_3$, with v being a vector in the three-space.

Conventionally, the problem of finding a line that passes through a set of boxes as depicted in FIG. 2 can be determined by "brute force" enumeration in which attempts are made to fit a line segment through all of the boxes by a trial and error procedure, after which a parametric line representation is found. A digital computer can be programmed to begin at a first endpoint of a trial line segment and "draw" extensions outwardly in three-space to a second endpoint, creating a line segment. The extensions are tested for passing through all the boxes. Such procedures are cumbersome and inefficient for the three-dimensional case, at best, and quickly become extremely difficult when more than a few boxes are involved. Brute force enumeration becomes virtually impossible in the general multi-dimensional case.

More sophisticated line-fitting methods have been developed, but these can be quite complex mathematically and difficult computationally. Often, such methods are not linear in terms of expected time to reach a solution in that doubling the number of boxes, for example, results in more than doubling the time to find a solution. Thus, the time to find a solution can increase dramatically when the number of boxes is increased or the dimensional space is enlarged. Even methods that provide solutions in linear expected time, that is, in what is referred to as O(n) time, can be quite complex mathematically and can involve, for example, probabilistic methods. See, for example, the article "Finding a Line Transversal of Axial Objects in Three Dimensions" by Nina Amenta in the Proceedings of the Third Annual ACM-SIAM Symposium on Discrete Algorithms, at pages 66–71 (1992).

From the discussion above, it should be apparent that there is a need for a method and apparatus that determines a line passing through axial boxes in three-space in linear time without requiring solution of complex equations and difficult computation. The present invention satisfies this need.

SUMMARY OF THE INVENTION

The present invention provides a digital computer method and apparatus for finding a line passing through three-dimensional axial boxes, if such a line exists, by representing the line in six variables defined by two three-tuples $X=(x_1, x_2, x_3)$ and $Y=(y_1, y_2, y_3)$, partitioning the solution space, and producing a set of linear inequalities in X and Y that must be satisfied by the line if it passes through the boxes and that can be solved by known linear programming methods. The linear programming solution specifies X and Y that are on the line. A parametric representation u+tv of the line can be obtained through a change of variables and can easily be displayed visually in a two-dimensional representation. The change in variables is necessary because, although a parametric representation is the typical manner of representing a line in space, it would not provide linear equations in u, t, and v and therefore would be more difficult to solve than the set of linear inequalities in X and Y. The invention can be generalized to the n-dimensional case for solution by digital computer and therefore can be applied to a broad range of problems. In this way, the invention provides a solution that specifies a transversal line, if it exists, and provides the solution in O(n) time.

The invention is advantageously implemented in a digital computer system having an operator interface for receiving instructions and data, a central processing unit for carrying out necessary computations and producing a set of linear inequalities, a display unit for displaying the resultant solution, and memory for containing appropriate programming steps and data. The programming includes a linear programming routine that receives the set of linear inequalities and finds a line, if it exists, defined by $X=(x_1, x_2, x_3)$ and $Y=(y_1, y_2, y_3)$. If a line exists that passes through all of the axial boxes in the data set, then the solution can be converted through a change of variables into a parametric representation u+tv. The solution is easily displayed graphically on a video terminal or printer in a two-dimensional representation. Alternatively, the solution can be displayed numerically by specifying u, t, and v or X and Y. The digital computer system can implement the n-dimensional case for a predetermined number n where X and Y, and the linear inequalities, are defined by $X=(x_1, x_2, \ldots, x_n)$ and $Y=(y_1, y_2, \ldots, y_n)$.

Other features and advantages of the present invention should be apparent from the following description of the preferred embodiment, which illustrates, by way of example, the principles of the invention.

DESCRIPTION OF THE PREFERRED EMBODIMENT

Figure 1:
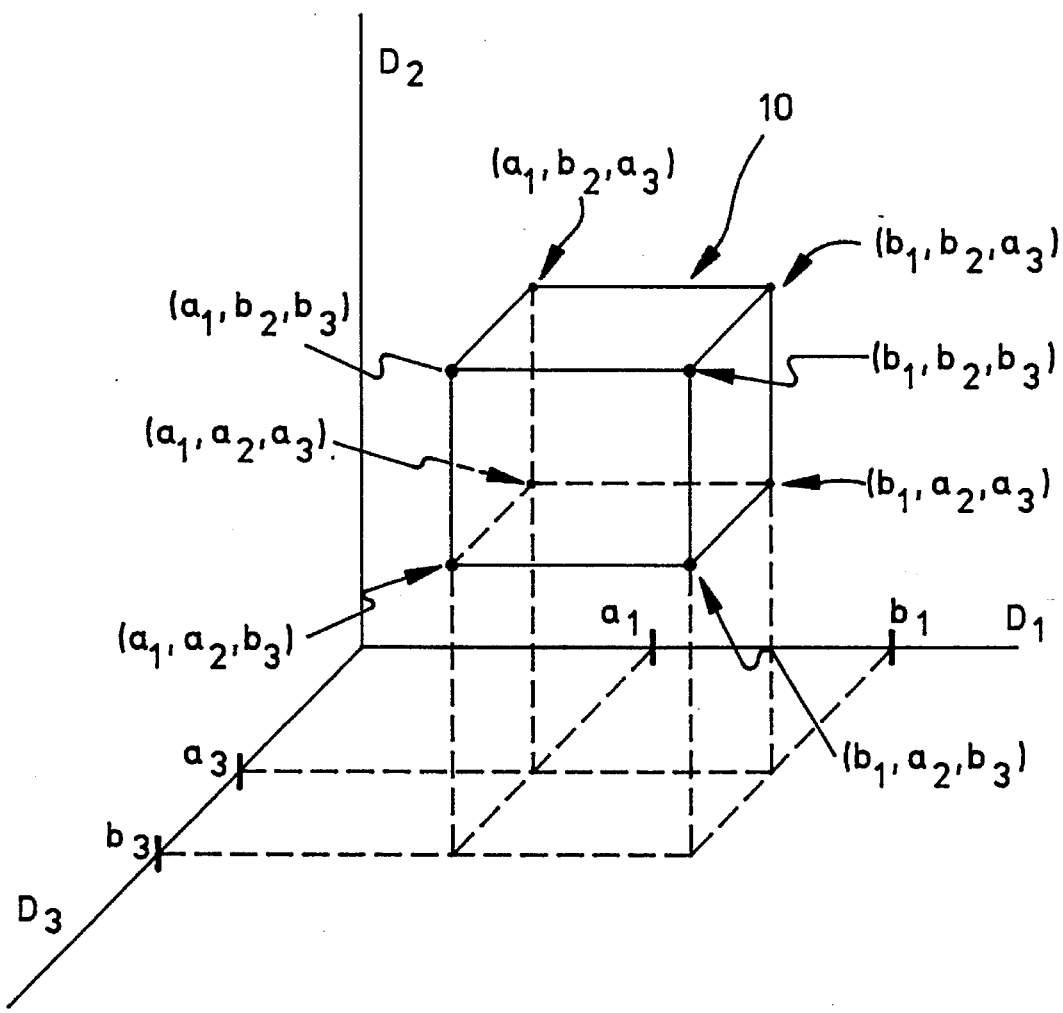
FIG. 1 illustrates an axial, rectangular box in three-space.
Figure 2:
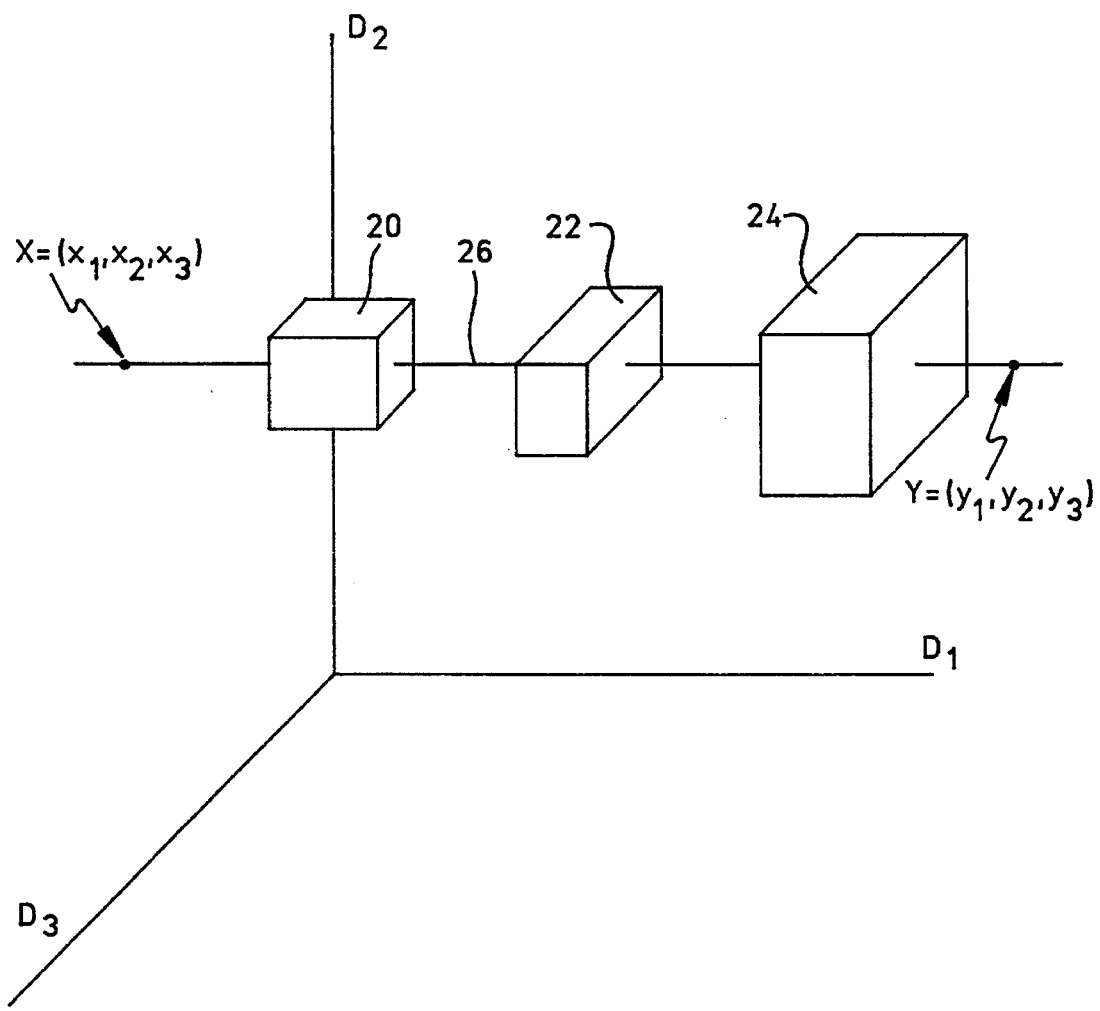
FIG. 2 illustrates a representation of the three-dimensional case of finding a line passing through three boxes.

The problem of finding a line passing through axial boxes, such as the box shown in FIG. 1 and illustrated by the boxes 20, 22, and 24 illustrated in FIG. 2 is solved by the present invention. The boxes can represent, for example, surfaces of objects corresponding to computer axial tomographic X-ray scans or magnetic resonance imaging data, or can represent buildings or windows in an architectural rendering. The vertices of each box are specified by three-tuples $(x_1, x_2, x_3)$. Each position of the three-tuple corresponds to a data point that represents a distance along the $D_1$, $D_2$, or $D_3$ axis such that the tuple position is either $a_i$ or $b_i$, i=1, 2, 3, where a position is an "a" if it is the minimum value of the box along an axis and the tuple position is a "b" if it is the maximum value of the box along an axis, as illustrated in FIG. 1.

The process of finding a line passing through the three boxes 20, 22, 24 is as follows. First, the set whose elements are 1.2, 3 (written as "{1,2,3}") is partitioned into three subsets represented by $I_+$, $I_0$, and $I_-$. The partition of {1,2,3} into subsets $I_+$, $I_0$, and $I_-$ characterizes the type of line to be examined. There are twenty-seven partitions and each of them corresponds to a certain family of candidate lines. Each partition is handled by solving a linear programming problem. In general, an n-dimensional case will produce $3^n$ partitions. After the partitions have been determined, a process in accordance with the invention produces a set of linear inequalities in accordance with the realization by the inventor that any transversal line passing through a set of axial boxes must satisfy certain conditions, which are described next. A partition $I_+$, $I_0$, $I_-$ also can be represented by a triple of characters from the set {+0 −}. For example, the partition $I_+=\{1,2\}$, $I_0=\emptyset$, and $I_-=\{3\}$ can be represented as (++ −), meaning that $y_1$ is +, $y_2$ is +, and $y_3$ is −.

A first group of inequalities produced in accordance with the invention is specified by the condition that for all boxes K and for every i that is an element of the set $I_0$ in the current partition, the maximum value of a box vertex $a_i$ must be less than or equal to the minimum value of a box vertex $b_i$ for each box K. This may be mathematically stated by the inequality For every $i \in I_0$, $\max_k a_i^k \le \min_k b_i^k$ for k=1, 2, ... K.

The superscript character represents the box number, not an exponent. In the FIG. 2 representation of the problem, there are three boxes and therefore K=3.

A representative group of the inequalities produced by this step for the three boxes shown in FIG. 2 are as follows. For purposes of illustration, the partitions (+0+), (+0−), and (+− −) will be considered. The equations for the remaining partitions are easily produced and understood using the equations for the illustrative partitions as a guide. For the partitions (+0+) and (+0−), where $I_0=2$, only one inequality will be produced, namely, that the maximum value as between $a_2^1$, $a_2^2$, and $a_2^3$ must be less than or equal to the minimum value as between $b_2^1$, $b_2^2$, and $b_2^3$. The partition (+− −) does not produce any inequality from the first condition. Conversely, all partitions where i=2, such as (+0+) and (+0−), share the inequality listed above. Thus, it should be clear that inequalities will not be produced for all partitions and there will be duplication for others. Those skilled in the art will recognize that certain of the partitions represent determining particular instances of the resulting transversal line. For example, the partition in which the second position is in $I_0$ indicates a transversal line that is parallel to the $D_2$ axis.

If the data is such that the vertices $a_i$ and $b_i$ do not satisfy the inequalities $\max_k a_i^k \le \min_k b_i^k$, then one of the conditions necessary for the existence of a transversal line is not satisfied, indicating no such line can be found, and the process can be halted. Thus, further computational time and effort is not wasted.

The next group of inequalities produced according to the method of the invention is specified by the condition that, in the case of a transversal line, for every i that is an element of the set $I_+$ of the partition, all $x_i$ must be greater than zero and for every i that is an element of the $I_-$ set of the partition, $x_i$ must be less than zero. This can be specified by the following inequality:

For every $i \in I_+$, $x_i>0$ and for every $i \in I_{31}$, $x_i<0$.

For example, for the partition (+0−), this second step of the procedure according to the invention generates the inequalities $x_1>0$ and $x_3<0$. For the partition (+− −), the second step generates the inequalities $x_1>0$, $x_2<0$, and $x_3<0$. Finally, for the partition (+0+), the inequalities produced are $x_1>0$ and $x_3>0$. It should be noted that, unlike the inequalities from the first step, these inequalities include the $x_i$ values corresponding to the transversal line $X=(x_1, x_2, x_3)$.

The third step of the procedure according to the invention recognizes that for all i and j that are elements of the $I_+$ set of a partition and for all the boxes K, it must be true that the difference of the product $a_i x_i$ and the data point $y_i$ must be less than or equal to the difference of $b_j x_j$ and $y_j$. In mathematical terms, this inequality may be represented by:

For all $i, j \in I_+$ and for all k, $a_i^k x_i - y_i \le b_j^k x_j - y_j$, k=1, 2, ... K.

The inequalities produced by this step will be illustrated by the three partitions (+0−), (+− −), and (+0+), as follows.

The condition for this group of inequalities is not satisfied by either of the first two partitions (+0−) and (+−−) because they do not have two partitions that are in the set $I_+$. Thus, the partitions (+0−) and (+−−) are not considered. Thus, the only illustrative partition that produces inequalities for this step is the partition (+0+), which produces the following inequalities:

$$a_1^1 x_1 - y_1 \leq b_3^1 x_3 - y_3$$

$$a_1^2 x_1 - y_1 \leq b_3^2 x_3 - y_3$$

$$a_1^3 x_1 - y_1 \leq b_3^3 x_3 - y_3.$$

The fourth step according to the method of the invention is specified by the condition that, for all i and j partitions that are elements of the set $I_-$ and for all boxes K, it must be true that the difference between $a_i x_i$ and $y_i$ must be greater than or equal to the difference between $b_j x_j$ and $y_j$. In mathematical terms, this linear inequality can be represented as:

For all $i, j \in I$ and for all $k$, $a_i^k x_i - y_i \geq b_j^k x_j - y_j$, $k=1, 2, \ldots K$.

Of the exemplary partitions (+0−), (+−−), and (+0+), it should be apparent that the partitions (+0−) and (+0+) do not meet the inequality conditions and therefore will not be considered. The exemplary partition (+−−) produces the following group of inequalities, where i=2, j =3:

$$a_2^1 x_2 - y_2 \geq b_3^1 x_3 - y_3$$

$$a_2^2 x_2 - y_2 \geq b_3^2 x_3 - y_3$$

$$a_2^3 x_2 - y_2 \geq b_3^3 x_3 - y_3.$$

The fifth and final group of linear inequalities produced in accordance with the method of the invention is specified by the condition that, for every i that is an element of the set $I_+$ of a partition and for every j that is an element of the set $I_-$ of a partition and for all of the boxes, it must be true that the difference between $b_i x_i$ and $y_i$ must be greater than or equal to the difference between $b_j x_j$ and $y_j$ and also that the difference between $a_j x_j$ and $y_j$ must be greater than or equal to the difference between $a_i x_i$ and $y_i$. In mathematical terms, this can be specified by:

For every $i \in I_+$ and $j \in I_-$ and for all $k$, $b_i^k x_i - y_i \geq b_j^k x_j - y_u$ and $$a_j^k x_j - y_j \geq a_i^k x_i - y_i, k=1, 2, \ldots, k.$$

It should be clear that for this set of inequalities, the partition (+0+) will not be considered because it does not have an $i \in I_+$ and $j \in I_-$. It also should be clear that the partitions (+0−) and (+−−) yield the same inequalities with respect to i=1 and j=3, and that both partitions produce one set of linear equations:

$$b_1^1 x_1 - y_1 \geq b_3^1 x_3 - y_3$$

$$a_3^1 x_3 - y_3 \geq a_1^1 x_1 - y_1$$

$$b_1^2 x_1 - y_1 \geq b_3^2 x_3 - y_3$$

$$a_3^2 x_3 - y_3 \geq a_1^2 x_1 - y_1$$

$$b_1^3 x_1 - y_1 \geq b_3^3 x_3 - y_3$$

$$a_3^3 x_3 - y_3 \geq a_1^3 x_1 - y_1.$$

The partition (+−−) also includes the condition where i=1 and j=2 and produces the following equations:

$$b_1^1 x_1 - y_1 \geq b_2^1 x_2 - y_2$$

$$a_2^1 x_2 - y_2 \geq a_1^1 x_1 - y_1$$

$$b_1^2 x_1 - y_1 \geq b_2^2 x_2 - y_2$$

$$a_2^2 x_2 - y_2 \geq a_1^2 x_1 - y_1$$

$$b_1^3 x_1 - y_1 \geq b_2^3 x_2 - y_2$$

$$a_2^3 x_2 - y_2 \geq a_1^3 x_1 - y_1.$$

Those skilled in the art will recognize that, under certain conditions of the vertex data values a and b, one or more of the five subsets of inequalities might comprise an empty solution set. That is, for any of the five groups of linear inequalities, it might be true that the produced inequalities cannot possibly be true simultaneously. In such a circumstance, there can be no solution to the complete system of inequalities and therefore there is no line that passes through all K boxes of the data. Thus, the method in accordance with the invention is halted whenever it is clear from any of the five groups of inequalities that the data shows no transversal line is possible. A no-solution indication is provided.

If at least one of the set of inequalities has a solution, then the inequalities are solved for the $x_i$ and $y_i$ values to determine the line specified by the three-tuples $(x_1, x_2, x_3)$ and $(y_1, Y_2, Y_3)$. The line will pass through each of the boxes K specified by the data comprising the vertices. Through a change of variables, a parametric representation u+tv can be obtained for the line. Those skilled in the art will recognize that all of the linear inequalities are linear relationships of the variables $x_i$ and $y_i$ and that the number of inequalities produced is directly proportional to the number of boxes K in the data. Thus, the inequalities can be solved by known linear programming methods and can be solved in linear O(n) time. A known linear programming method is described, for example, in the article by the present inventor entitled "Linear Programming in Linear Time When the Dimension Is Fixed," published in Journal of the ACM, Vol. 31, No. 1, Jan. 1984 at 114–127.

Figure 3:
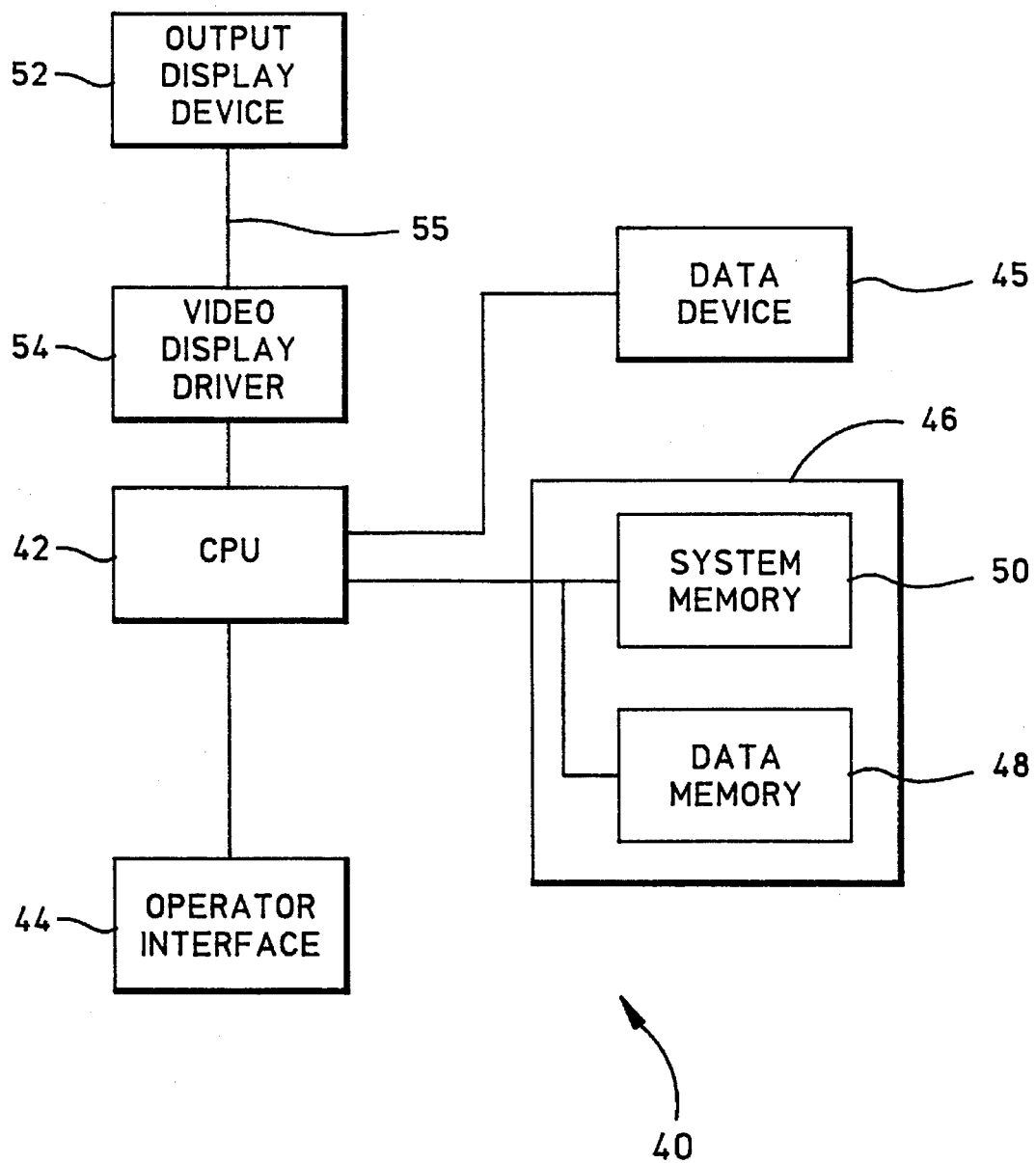
FIG. 3 is a block diagram that illustrates a digital computer implementation of the invention.

FIG. 3 shows a block diagram of a computer system 40 constructed in accordance with the present invention to determine a line that passes through a set of axial objects in n-dimensional space. The system includes a central processing unit (CPU) 42 that performs the required computations. The CPU can comprise, for example, an IBM "System 390" CPU. The CPU receives input data and commands from an operator via an operator interface 44, such as a keyboard, and a data device 45, such as a disk drive. The input data comprises the vertices of the boxes. As noted above, the boxes can represent, for example, surfaces of objects corresponding to computer axial tomographic X-ray scans or magnetic resonance imaging data, or can represent buildings or windows in an architectural rendering. The computer system 40 includes memory 46 that can comprise, for example, a portion of memory referred to as data memory 48 and a portion of memory referred to as system memory 50. The data memory can contain data comprising points defining the box vertices. The system memory is generally a high-speed semiconductor memory associated with the CPU that stores programs and temporary data. Finally, the system includes an output display device 52 that provides the results of the line-determining steps.

In the computer system 40 illustrated in FIG. 3, the output display device 52 comprises a video terminal for two-dimensional display of results, showing the boxes and the transversal line or a no-solution indication, on the video terminal screen. Thus, the system also includes a display driver 54 that produces an appropriate video display signal 55 that is provided to the video terminal for display. The video terminal comprises a display device, such as a cathode ray tube or liquid crystal display, that reproduces the display signal in a visually observable display. Alternatively, the output display device 52 can comprise a plotter or printer that receives a display signal and provides the results on paper media. If the output display device includes more than one such output device, then the operator can select one or more of the devices for receipt of the solution via the operator interface 44.

Figure 4:
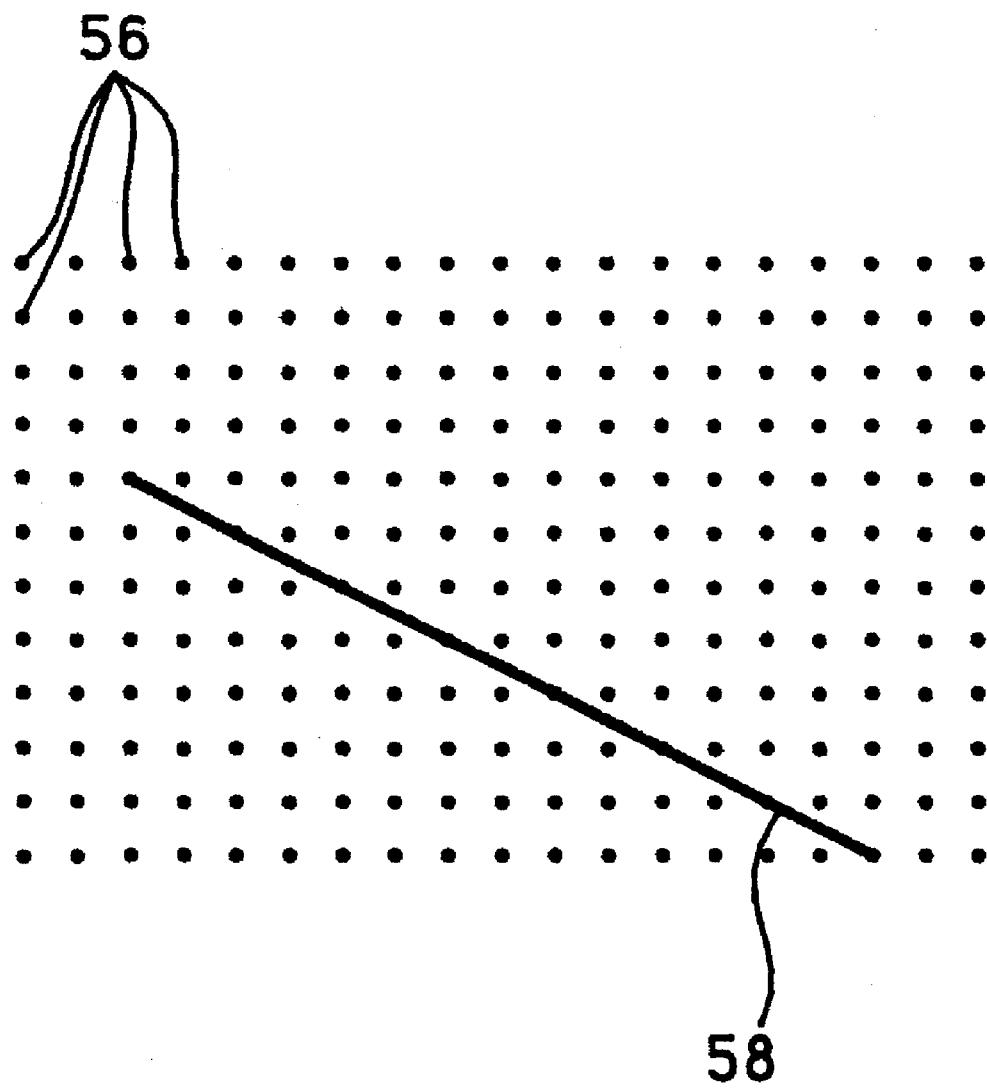
FIG. 4 is a representation of the output display illustrated in FIG. 3.

FIG. 4 is an enlarged representation of the surface of the video terminal output display device 52. FIG. 4 shows that the surface of the video terminal screen comprises a plurality of pixels 56. The video signal 55 produced by the video display driver 54 causes an image to be produced on the video terminal by selectively causing pixels to become luminescent. For example, a line segment 58 is indicated in FIG. 4 by the luminescence of various pixels. The remaining pixels are not made luminescent. An observer viewing the video terminal screen visually "connects" the luminescent pixels and perceives a continuous line segment.

Figure 5:
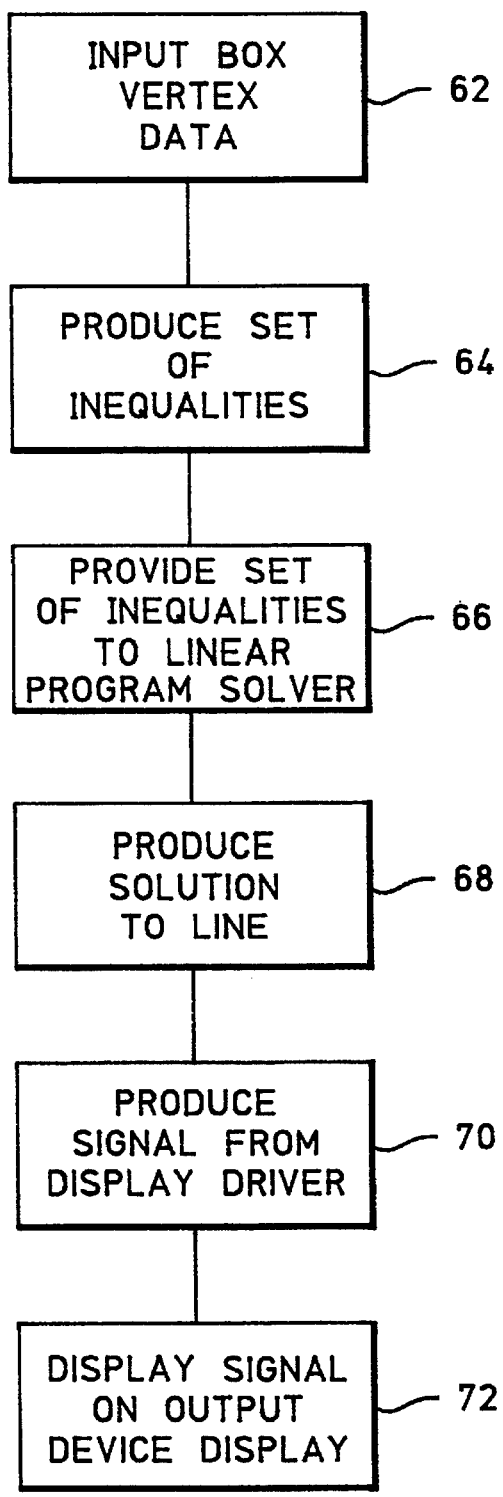
FIG. 5 is a flow diagram illustrating the method of the invention.

The operation of the system illustrated in FIG. 3 is represented by the steps of the flow diagram illustrated in FIG. 5. The flow diagram steps can be implemented as a software program in the system CPU 42 and system memory 50 (FIG. 3). First, data comprising vertices that define a set of boxes in n-dimensional space are provided to the system as indicated by the flow diagram box numbered 62. Next, the system CPU produces the set of linear inequalities in accordance with the partitions of n-space and the conditions discussed above, as represented by the flow diagram box numbered 64. After the set of inequalities is produced, at the box numbered 66 they are provided to a linear programming solver. As noted above, such linear programming solvers employ methods that are well-known to those skilled in the art. The linear programming solver can be implemented as a software program in the CPU 42 and system memory 50 (FIG. 3). When the linear inequalities have been solved, at the flow diagram box numbered 68 the system CPU produces the solution to a line specified by $X=(x_1, x_2, x_3)$ and $Y=(y_1, Y_2, Y_3)$. Finally, in the preferred embodiment, the system CPU causes the output of a line that passes through all of the boxes to be displayed by providing the resultant solution to a display driver that produces a display signal, as represented by the flow diagram box numbered 70, followed by the display of the signal on the output display, as indicated by the box numbered 72. As noted above, the display driver can produce either a video signal or a signal appropriate to printed output.

Thus, the present invention provides a method and system for determining a line that passes through a set of rectangular, axial boxes defined by vertices in n-dimensional space and does so in O(n) time using linear programming methods that are well-known to those skilled in the art. In this way, the problem of determining a line passing through boxes becomes much more efficient than conventional methods, especially in the case of higher-dimensional data and large numbers of boxes. The method and system according to the present invention have wide applicability to the field of computer graphics and visual displays of three-dimensional objects.

The present invention has been described above in terms of a presently preferred embodiment so that an understanding of the present invention can be conveyed. There are, however, many configurations for systems not specifically described herein, but with which the present invention is applicable. The present invention should therefore not be seen as limited to the particular embodiment described herein, but rather, it should be understood that the present invention has wide applicability. All modifications, variations, or equivalent arrangements that are within the scope of the attached claims should therefore be considered to be within the scope of the invention.

I claim:

1. A method of digitally determining and displaying a line that passes through a set of K boxes of a display image in a computer system, the boxes defined by box data vertex values defined with respect to a coordinate system and stored in memory of the computer system, such that the line passes through display image surfaces of each box in the set and thereby comprises a transversal line of the display image, the method comprising the steps producing a transformed set of digital box data vertex values comprising three-tuples $(x_1, x_2, x_3)$ in the computer memory that define respective vertex values of the K boxes relative to axes $D_1$, $D_2$, and $D_3$ of the coordinate system such that the tuple position corresponding to a vertex value of a box is denoted either $a_i$ or $b_i$, i=1, 2, 3 by a central processor unit of the computer system, where a vertex value of a box is denoted as an "a" if it is the minimum value of the box data vertex values along a respective D axis and the vertex value is denoted as a "b" if it is the maximum value of the box data vertex values along a respective D axis;

producing a partition set in the computer memory comprising all three-tuples determined by the central processor unit as having elements selected from the set {+, 0, −} such that each three-tuple element corresponds to a partition subset $I_+$, $I_0$, or $I_-$;

producing a set of linear inequality equations stored in the computer memory by the central processing unit that specify a set of line conditions comprising (1) for all the K boxes and for every digital box data vertex value that is an element of the partition subset $I_0$, the maximum value of a box vertex value $a_i$ is less than or equal to the minimum value of a box vertex value $b_i$ for each box K, (2) for every i that is an element of the partition subset $I_+$, all box data vertex values $x_i$ are greater than zero and for every i that is an element of the partition subset $I_-$, the $x_i$ are less than zero, (3) for all i and j that are elements of the partition subset $I_+$ and for all the boxes K, the difference of the product $a_i x_j$ and a box data vertex value $y_i$ is less than or equal to the difference of $b_j x_j$ and $y_j$, (4) for all i and j that are elements of the partition subset $I_-$ and for all the K boxes, the difference of the product $a_i x_j$ and a box data value $y_i$ is greater than or equal to the difference of $b_j x_j$ and $y_j$, (5) for every i that is an element of the partition subset $I_+$ and for every J that is an element of the partition subset $I_-$ and for all of the K boxes, the difference of the product $b_i x_j$ and the box data vertex value $y_i$ is greater than or equal to the difference of $b_j x_j$ and $y_j$ and also the difference of the product $a_j x_j$ and the box data vertex value $y_j$ is greater than or equal to the difference of $a_i x_i$ and $y_i$;

producing a resultant solution comprising two three-tuples $R=(r_1, r_2, r_3)$ and $S=(s_1, s_2, s_3)$ in the computer memory that are determined by the central processor unit of the computer system to satisfy the line conditions and thereby determine the transversal line;

producing a central processor unit parametric representation of the transversal line determined by R and S in a form defined by an equation u+tv, where u and v are vectors and t is a scalar variable with respect to the coordinate system;

producing a display signal determined by the central processing unit as corresponding to the resultant solution and the parametric representation of the transversal line and set of boxes; and displaying a plurality of objects and display signal simultaneously on a two-dimensional display of the computer system.

2. A method as defined in claim 1, wherein the step of producing a display signal comprises providing the resultant solution to a display driver for display on a video display monitor.

3. A method as defined in claim 1, wherein the step of producing a set of inequality equations comprises producing inequality equations over the set of axial boxes k=1, 2, ... , K, wherein the inequality equations are specified as follows:

For every $i \in I_0$, $\max_k a_i^k \leq \min_k b_i^k$      (i);

For $i \in I_+$, $x_i > 0$ and for $i \in I_-$, $x_i < 0$      (ii);

For all $i, j \in I_+$, and for k=1, 2, ..., n, $a_i^k x_i - y_i \geq b_j^k x_j - y_j$      (iii);

For all $i, j \in I_-$, and for k=1,2, ... n, $a_i^k x_i - y_i \geq b_j^k x_j - y_j$;      (iv)

and

For every $i \in I_+$ and $j \in I_-$, and for k=1, 2, ..., n, $b_i^k x_i - y_i \geq b_j^k x_j - y_j$ and a $a_j^k x_j^{i-y}_j \geq a_i^k x_i - y_i$      (v).

4. A method as defined in claim 3, wherein the step of producing a resultant solution comprises providing the set of inequality equations to a linear programming solver.

5. A method as defined in claim 3, wherein the step of producing a resultant solution includes the step of providing a no-solution indication and halting solution activity if no solution exists for any one of the substeps of producing the inequality equations.

6. A method as defined in claim 5, wherein the step of producing a parametric representation u+tv includes the steps of:

finding a $u_i$ such that $\max_k a_i^k \leq u_i \leq \min_k b_i^k$ and for all i where $u_i$ is not zero, determining $v_i = 1/r_i$ and $u_i = s_i/r_i$ and providing an output result of u+vt where u=($u_1, u_2, ..., u_n$), v=($v_1, v_2, ..., v_n$) and t is a scalar parameter, for n=3.

7. An apparatus for determining a transversal line that passes through surfaces of a set of K boxes having box vertices defined by three-tuples and displaying the resultant transversal line, the apparatus comprising:

input memory means for receiving box data representing the vertices that define the set of K axial boxes and for storing the data;

control means for retrieving the box data from the input memory means and computing a set of linear inequalities that are functions of R=($r_1, r_2, r_3$) and S=($s_1, s_2, s_3$) and are defined by a set of line conditions comprising (1) for all the K boxes and for every digital box data vertex value that is an element of the partition subset $I_0$, the maximum value of a box vertex value $a_i$ is less than or equal to the minimum value of a box vertex value $b_i$ for each box K, (2) for every i that is an element of the partition subset $I_+$, all box data vertex values $x_i$ is greater than zero and for every i that is an element of the partition subset $I_-$, the $x_i$ is less than zero, (3) for all i and j that are elements of the partition subset $I_+$ and for all the boxes K, the difference of the product $a_i x_i$ and a box data vertex value $y_i$ is less than or equal to the difference of $b_j x_j$ and $y_j$, (4) for all i and j that are elements of the partition subset $I_-$ and for all the K boxes, the difference of the product $a_i x_i$ and a box data vertex value $y_i$ is greater than or equal to the difference of $b_j x_j$ and $y_j$, (5) for every i that is an element of the partition subset $I_+$ and for every j that is an element of the partition subset $I_-$ and for all of the K boxes, the difference of the product $b_i x_i$ and the box data vertex value $y_i$ is greater than or equal to the difference of $b_j x_j$ and $y_j$ and also the difference of the product $a_j x_j$ and the box data vertex value $y_j$ is greater than or equal to the difference of $a_i x_i$ and $y_i$;

such that the linear inequalities must be true if a transversal line specified by R and S exists for the set of axial boxes;

solver means for solving the set of linear inequalities and determining the transversal line solution, if one exists, specified by R and S; and an output display that provides a two-dimensional representation of the line determined by the solver means and defined by R and S.

8. An apparatus as defined in claim 7, wherein the output display comprises a video display monitor and the control means includes a display driver that converts the transversal line solution into a video signal that can be received by the video display monitor.

9. An apparatus as defined in claim 7, wherein the control means is adapted to receive a set of digital box data comprising three-tuples ($x_1, x_2, x_3$) that define vertex values of the K boxes according to a predetermined coordinate system having axes $D_1$, $D_2$, and $D_3$ such that the tuple position corresponding to a vertex value is either $a_i$ or $b_i$, i=1, 2, 3, where a vertex value is an "a" if it is the minimum value of the box along an axis and the vertex value is a "b" if it is the maximum value of the box along an axis and produce a partition set comprising all three-tuples having elements selected from the set {+, 0, −} such that each three-tuple element corresponds to a partition subset $I_+$, $I_0$, or $I_-$ and for two three-tuples R=($r_1, r_2, r_3$) and S=($s_1, s_2, s_3$) the inequality equations are specified by conditions as follows:

For every $i \in I_0$, $\max_k a_i^k \leq \min_k b_i^k$ k=1, 2, ... K      (a);

For $i \in I_+$, $x_i > 0$ and for $i \in I_-$, $x_i < 0$      (b);

For all $i, j \in I$, and for k=1, 2, ..., K, $a_i^k x_i - y_i \leq b_j^k x_j - y_j$      (c);

For all $i, j \in I_-$, and for k=1, 2, ..., K, $a_i^k x_i - y_i \geq b_j^k x_j - y_j$      (d);

and

For every $i \in I_+$ and $j \in I_-$, and for k=1, 2, ..., K, $b_i^k x_i - y_i \geq b_j^k x_j - y_j$ and $a_j^k x_j - y_j \geq a_i^k x_i - y_i$      (e).

10. An apparatus as defined in claim 9, wherein the control means halts the solver means if the inequalities specified by any of the conditions (a) through (e) specify an empty set.

11. A method of determining a line-of-sight comprising a transversal line that passes through surfaces of a set of K axial, three-dimensional boxes represented in a computer system by box data vertex values and displaying the transversal line and the K boxes in a display image representation of the computer system, the method of comprising the steps of:

receiving the set of box vertex data values comprising three-tuples that define vertices of the boxes relative to a coordinate system;

producing a partition set that is stored in the computer memory and determined by a central processor unit of the computer system as comprising all three-tuples in the computer memory having elements selected from the set $\{+, 0, -\}$ such that each three-tuple element corresponds to a partition subset $I_+$, $I_0$, or $I_-$;

producing a set of linear inequality equations stored in the computer memory by the central processing unit that specify line conditions comprising the set of (1) for all the K boxes and for every digital box data vertex value that is an element of the partition subset $I_0$, the maximum value of a box data vertex value $a_i$ is less than or equal to the minimum value of a box data vertex value $b_i$ for each box K, (2) for every i that is an element of the partition subset $I_+$, all box data vertex values $x_i$ are greater than zero and for every i that is an element of the partition subset $I_-$, the $x_i$ are less than zero, (3) for all i and j that are elements of the partition subset I, and for all the boxes K, the difference of the product $a_i x_i$ and a box data vertex value $y_i$ is less than or equal to the difference of $b_j x_j$ and $y_j$, (4) for all i and j that are elements of the partition subset $I_-$ and for all the K boxes, the difference of the product $a_i x_i$ and a box data vertex value $y_i$ is greater than or equal to the difference of $b_j x_j$ and $y_j$, (5) for every i that is an element of the partition subset $I_+$ and for every j that is an element of the partition subset $I_-$ and for all of the K boxes, the difference of the product $b_i x_i$ and the box data vertex value $y_i$ is greater than or equal to the difference of $b_j x_j$ and $y_j$ and also the difference of the product $a_j x_j$ and the box data vertex value $y_j$ is greater than or equal to the difference of $a_i x_i$ and $y_i$;

producing a resultant linear programming solution to the set of linear inequality equations, the solution comprising two three-tuples $R=(r_1, r_2, r_3)$ and $S=(s_1, s_2, s_3)$ stored in the computer memory that are determined by the central processing unit to satisfy the specified line conditions and thereby determine the transversal line;

producing a parametric representation of the transversal line solution, the parametric representation produced by the central processing unit and having a form $u+tv$, where u and v are vectors and t is a scalar value in the coordinate system, of the line-of-sight defined by the three-tuples X and Y;

producing a display signal, corresponding to a computer system display image representation of the resultant linear programming solution and of the box data, and providing it to a display driver for display of the resultant solution and K boxes on a two-dimensional display device of the computer system; and displaying the display signal on the two-dimensional display device as a line that passes through the set of K boxes in the display image.

* * * * *

UNITED STATES PATENT AND TRADEMARK OFFICE
CERTIFICATE OF CORRECTION

PATENT NO. : 5,481,658
DATED : Jan. 2, 1996
INVENTOR(S) : Nimrod Megiddo

It is certified that error appears in the above-indentified patent and that said Letters Patent is hereby corrected as shown below:

Col. 8, line 14: after "the steps" insert -- of: --

Col. 9, line 23: change " $\geqq$ " to -- $\leq$ --
(Equation, roman numeral (iii))

Col. 9, line 29: change "and a" to --and--
(second line of eq. (v), last line of claim 3) change " $x_j^{i-y}$ " to -- $x_j - y_j$ --

Col. 10, line 49: change " $i.j \in L$ " to -- $i, j \in L_+$, --
(eq. (C) of claim 9)

Signed and Sealed this

Fourteenth Day of May, 1996

Attest:

BRUCE LEHMAN

Attesting Officer     Commissioner of Patents and Trademarks